United States Patent [19]

Brown et al.

[11] 4,412,101

[45] Oct. 25, 1983

[54] CALL DATA MONITORING FOR ELECTROMECHANICAL TELEPHONE SWITCHING SYSTEMS

[75] Inventors: Wallace G. Brown, Redmond; Otha C. Lee, Kirkland, both of Wash.

[73] Assignee: Proctor & Associates Co., Redmond, Wash.

[21] Appl. No.: 327,063

[22] Filed: Dec. 3, 1981

[51] Int. Cl.³ ............................................ H04M 15/18
[52] U.S. Cl. ........................... 179/7.1 R; 179/18 FH; 179/18 ES
[58] Field of Search ............. 179/7.1 R, 7.1 TP, 8 R, 179/9, 10, 18 FH, 27 DB, 175.2 C, 17 A, 18 ES

[56] References Cited

U.S. PATENT DOCUMENTS

| | | | |
|---|---|---|---|
| 2,282,893 | 5/1942 | Schwartz | 179/17 |
| 2,401,352 | 6/1946 | Hersey | 179/17 |
| 2,615,094 | 10/1952 | Mitchell | 179/17 |
| 3,278,687 | 10/1966 | Everett | 179/2 |
| 3,283,078 | 11/1966 | Avery | 179/7.1 TP |
| 3,382,322 | 5/1968 | Duerden et al. | 179/2 |
| 3,522,385 | 7/1970 | Stepan et al. | 179/18 |
| 3,579,254 | 5/1971 | Carmody et al. | 179/17 |
| 3,862,374 | 1/1975 | Evers | 179/18 |
| 4,099,031 | 7/1978 | Proctor et al. | 179/17 |

Primary Examiner—Stafford D. Schreyer
Attorney, Agent, or Firm—Christensen, O'Connor, Johnson & Kindness

[57] ABSTRACT

In order to provide call data monitoring for an Automatic Electric step-by-step switching system, the identification of the line number of a calling subscriber line in a group of subscriber lines is accomplished by identifying which of the line finders for that group has been selected by detecting a marked location in the selected line finder corresponding to the calling subscriber line and by detecting which of the common control relays for the group has selected and controlled the line finder. Identification of the line finder, the marked location and the common control relays are converted into the line number of the calling subscriber and stored as a first item in a call data record. The dialed telephone number of the called subscriber is determined and is stored as a second item in the call data record. The start time of the call is determined and is stored as a third item in the call data record. The duration of the call is determined and is stored as a fourth item in the call data record. Modifications necessary to provide call data monitoring for other types of step-by-step switching systems and for all-relay switching systems are also set forth.

17 Claims, 10 Drawing Figures

| | RLY | FIRST PULSE SET | SECOND PULSE SET | LINES |
|---|---|---|---|---|
| LF1–LF10 | A | 10 | 1,2,..., 9, 10 | L101, L102,..., L109, L100 |
| | A | 9 | 1,2,..., 9, 10 | L191, L192,..., L199, L190 |
| | A | 8 | 1,2,..., 9, 10 | L181, L182,..., L189, L180 |
| | A | 7 | 1,2,..., 9, 10 | L171, L172,..., L179, L170 |
| | A | 6 | 1,2,..., 9, 10 | L161, L162,..., L169, L160 |
| | A | 5 | 1,2,..., 9, 10 | L151, L152,..., L159, L150 |
| | A | 4 | 1,2,..., 9, 10 | L141, L142,..., L149, L140 |
| | A | 3 | 1,2,..., 9, 10 | L131, L132,..., L139, L130 |
| | A | 2 | 1,2,..., 9, 10 | L121, L122,..., L129, L120 |
| | A | 1 | 1,2,..., 9, 10 | L111, L112,..., L119, L110 |
| | B | 10 | 1,2,..., 9, 10 | L1, L2,..., L9, L0 |
| | B | 9 | 1,2,..., 9, 10 | L91, L92,..., L99, L90 |
| | B | 8 | 1,2,..., 9, 10 | L81, L82,..., L89, L80 |
| | B | 7 | 1,2,..., 9, 10 | L71, L72,..., L79, L70 |
| | B | 6 | 1,2,..., 9, 10 | L61, L62,..., L69, L60 |
| | B | 5 | 1,2,..., 9, 10 | L51, L52,..., L59, L50 |
| | B | 4 | 1,2,..., 9, 10 | L41, L42,..., L49, L40 |
| | B | 3 | 1,2,..., 9, 10 | L31, L32,..., L39, L30 |
| | B | 2 | 1,2,..., 9, 10 | L21, L22,..., L29, L20 |
| | B | 1 | 1,2,..., 9, 10 | L11, L12,..., L19, L10 |
| LF11–LF20 | A | 10 | 1,2,..., 9, 10 | L111, L112,..., L119, L110 |
| | A | 9 | 1,2,..., 9, 10 | L121, L122,..., L129, L120 |
| | A | 8 | 1,2,..., 9, 10 | L131, L132,..., L139, L130 |
| | A | 7 | 1,2,..., 9, 10 | L141, L142,..., L149, L140 |
| | A | 6 | 1,2,..., 9, 10 | L151, L152,..., L159, L150 |
| | A | 5 | 1,2,..., 9, 10 | L161, L162,..., L169, L160 |
| | A | 4 | 1,2,..., 9, 10 | L171, L172,..., L179, L170 |
| | A | 3 | 1,2,..., 9, 10 | L181, L182,..., L189, L180 |
| | A | 2 | 1,2,..., 9, 10 | L191, L192,..., L199, L190 |
| | A | 1 | 1,2,..., 9, 10 | L101, L102,..., L109, L100 |
| | B | 10 | 1,2,..., 9, 10 | L11, L12,..., L19, L10 |
| | B | 9 | 1,2,..., 9, 10 | L21, L22,..., L29, L20 |
| | B | 8 | 1,2,..., 9, 10 | L31, L32,..., L39, L30 |
| | B | 7 | 1,2,..., 9, 10 | L41, L42,..., L49, L40 |
| | B | 6 | 1,2,..., 9, 10 | L51, L52,..., L59, L50 |
| | B | 5 | 1,2,..., 9, 10 | L61, L62,..., L69, L60 |
| | B | 4 | 1,2,..., 9, 10 | L71, L72,..., L79, L70 |
| | B | 3 | 1,2,..., 9, 10 | L81, L82,..., L89, L80 |
| | B | 2 | 1,2,..., 9, 10 | L91, L92,..., L99, L90 |
| | B | 1 | 1,2,..., 9, 10 | L1, L2,..., L9, L0 |

Fig. 6.

CALL DATA MONITORING FOR ELECTROMECHANICAL TELEPHONE SWITCHING SYSTEMS

FIELD OF THE INVENTION

This invention generally relates to the monitoring of data related to telephone calls for the purpose of call billing, and more particularly to methods and apparatus which permit the monitoring of such data for both local and long-distance calls placed through an electromechanical telephone switching system.

BACKGROUND OF THE INVENTION

Many systems are currently in use for monitoring data related to long-distance or toll calls for the purpose of billing the cost of the long-distance call to the calling subscriber. The data that is usually monitored includes the directory number of the calling subscriber, the directory number of the called subscriber, the time at which the call starts, and the duration of the call.

A typical central office includes a switching system which functions to interconnect the line of the calling subscriber either directly to the line of the called subscriber, or indirectly to the line of the called subscriber through a local trunk going to another central office if the call is a local call, or indirectly to the line of the called subscriber through a toll trunk going to a toll office if the call is a long-distance call. The switching systems commonly in use today can be classified either as electromechanical or electronic. By far the majority of switching systems are electromechanical and these include step-by-step and all-relay switching systems.

Considering now a central office including a typical step-by-step switching system, each of the subscriber lines connected to the central office is coupled through an associated line circuit to the stationary contact banks of a group of line finders. Movable contacts of each line finder are connected to movable contacts of an associated first selector which has a stationary bank of contacts to which are connected various trunks including one or more toll trunks.

Assuming now that one of the subscribers initiates the placing of a long-distance call, a resultant off-hook condition of the telephone instrument of the calling subscriber is detected by the corresponding line circuit which responsively causes central office battery to be applied to the calling subscriber line and actuates one of the line finders. The line finder then proceeds to step its movable contacts through its stationary contact banks until the calling subscriber line is found, at which time the calling subscriber line is cut-through to the associated first selector and dial tone is placed on the calling subscriber line. Thereafter, the calling subscriber dials the telephone number of the called subscriber. In response to a first digit of the dialed telephone number such as the commonly used "1" digit, the associated first selector steps its movable contacts through its stationary contact bank until an appropriate toll trunk is found, at which time the first selector cuts-through to the toll trunk. Accordingly, a unique circuit is completed from the telephone instrument of the calling subscriber to the toll office through the calling subscriber line, the corresponding line circuit, one of the line finders, the associated first selector, and the toll trunk. Subsequent digits of the dialed telephone number including the area code and the directory number of the called subscriber are then received by and stored in a register within the toll office.

Identification of the calling subscriber is usually provided by automatic number identification apparatus located at the central office. When the dialed telephone number has been stored in the register in the toll office, the toll office transmits a signal to the central office via the toll trunk which causes a line splitting circuit to split the toll trunk into a first portion going to the first selector and a second portion going to the toll office. The automatic number identification apparatus includes a register sender which is connected to the first and second portions of the toll trunk through the line splitting circuit and also includes an ANI matrix which is interconnected with the register sender and with each of the line circuits in the switching system. Upon actuation of the line splitting circuit, the register sender places a unique signal on the first portion of the toll trunk which appears only at the line circuit of the calling subscriber line due to the unique switching path provided through the first selector and the line finder. The ANI matrix detects that line circuit upon which the unique signal appears and forwards the corresponding directory number of the calling subscriber to the register sender. The register sender then transmits the directory number of the calling subscriber to the register in the toll office via the second portion of the toll trunk. When transmission has been completed, the line splitting circuit is deactuated by the register sender to restore the connection between the first selector and the toll office, and the long-distance call proceeds, with monitoring of additional call data (such as the duration of the call) being provided by the toll office. Further details concerning representative automatic number identification apparatus known to the prior art can be found in U.S. Pat. Nos. 3,522,385, Stepan, and 4,099,031, Proctor et al. (which is assigned to the assignee of the present invention).

In view of the increased costs of service, many telephone companies now intend to provide individual call billing for not only long-distance calls but also all local calls, with the cost of each such call being related to the distance between the calling and called subscribers and the duration of the call. It is therefore necessary to provide call data monitoring for all calls placed through the switching systems of the company. In the particular situation of electromechanical switching systems, the methods and apparatus currently used to provide call data monitoring for long-distance calls were not designed for and are not capable of providing call data monitoring for all calls. These methods and apparatus also do not provide for local monitoring of all data related to a call (rather, the complete call data is monitored only at the toll office). It is therefore necessary to devise new methods and apparatus which permit call data monitoring, including automatic number identification, for electromechanical telephone switching systems.

SUMMARY OF THE INVENTION

Briefly, the line number of a calling subscriber line in a group of subscriber lines connected to an electromechanical telephone switching system of a type consisting of step-by-step and all-relay switching systems is determined in the following manner.

It should be understood that a switching system of this type includes: a plurality of line finders for the group, wherein each of the subscriber lines in the group is terminated at a unique location in each of the line finders and wherein each of the line finders is operative to couple one of the subscriber lines to an associated line finder line; and, common control equipment for the group that has connected thereto each of the subscriber lines in the group and that is connected to each of the line finders by a plurality of control leads, the common control equipment being operative to detect a calling subscriber line in the group, to responsively mark the location corresponding to the detected calling subscriber line in each line finder, to select one of the line finders whereupon the associated line finder line is seized, and to cause the selected line finder to find the marked location corresponding to the calling subscriber line.

The method comprises the steps of:

detecting the marked location in the selected line finder by monitoring the signal on at least one of the control leads between the common control equipment and the selected line finder; and, converting the detected marked location into the line number of the calling subscriber line.

Considering now a step-by-step switching system, it should be understood that each line finder comprises stationary contact banks wherein each of the subscriber lines in the group is terminated at a unique location, and movable contacts for engaging the stationary contact banks to couple one of the subscriber lines to the associated line finder line. The common control equipment includes line equipment operative to detect a calling subscriber line in that group and to responsively mark the location corresponding to the calling subscriber line in the stationary contact banks in each line finder, and also includes common control relays that are responsive to detection of a calling subscriber line to select one of the line finders and to exchange signals with the selected line finder on the plurality of control leads so as to cause the selected line finder to move its movable contacts until the marked location corresponding to the calling subscriber line is found. The unique location at which each subscriber line is terminated in the stationary contact banks in each line finder is defined by a unique vertical level in a plurality of vertical levels and by a unique rotary position in plurality of rotary positions in the stationary contact banks. A selected line finder is caused by the common control relays to find a marked location in its stationary contact banks by first stepping its movable contacts through the plurality of vertical levels until a marked vertical level is found and by thereafter stepping its movable contacts through the plurality of rotary positions until a marked rotary position is found, wherein each vertical step is represented by a corresponding pulse in a first pulse set on a first one of the control leads and each rotary step is represented by a corresponding pulse in a second pulse set on the first one of the control leads.

In such a step-by-step switching system, the marked location in the stationary contact banks in the selected line finder preferably is detected by determining the number of pulses in the first and second pulse sets on the first one of the control leads.

Once the line number of the calling subscriber line has been determined, the dialed telephone number of the called subscriber is determined by monitoring the line finder line associated with the selected line finder to detect successive dial pulse sequences thereon. A start time for the call is then determined by monitoring the line finder line to detect the start of answer supervision, and the duration of the call is determined by monitoring the line finder line to determine the time between the start of answer supervision and release of the line finder line.

A call data record is then assembled for each call that includes the line number of the calling subscriber line, the dialed telephone number, the start time of the call and the duration of the call.

Preferably, call data monitoring is provided by a plurality of front end processors, a storage means, and a main processor. Each of the front end processors provides call data monitoring for a set of subscriber lines connected to the switching system (with each set including a plurality of subscriber line groups) and assembles a call data record for each call placed on a calling subscriber line in the set. The main processor is interconnected with the plurality of front end processors and with the storage means and is operative to receive each call data record from each of the plurality of front end processors, to convert the line number in each received call data record into the corresponding directory number of the calling subscriber, and to store each converted call data record in the storage means.

BRIEF DESCRIPTION OF THE DRAWINGS

The invention can best be understood by reference to the following portion of the specification, taken in conjunction with the accompanying drawings in which:

FIG. 6 is a look-up table used by the front end processor in providing automatic number identification; and, FIGS. 7A-7D are a flow chart of the program steps undertaken by one of the front end processors in providing call data monitoring.

DESCRIPTION OF A PREFERRED EMBODIMENT

The call data monitoring method and apparatus of the present invention will first be described with reference to their use with Automatic Electric step-by-step (SXS) switching systems, and reference will be made hereinafter to modifications of the method and apparatus for use with other types of electromechanical telephone switching systems.

Figure 1:
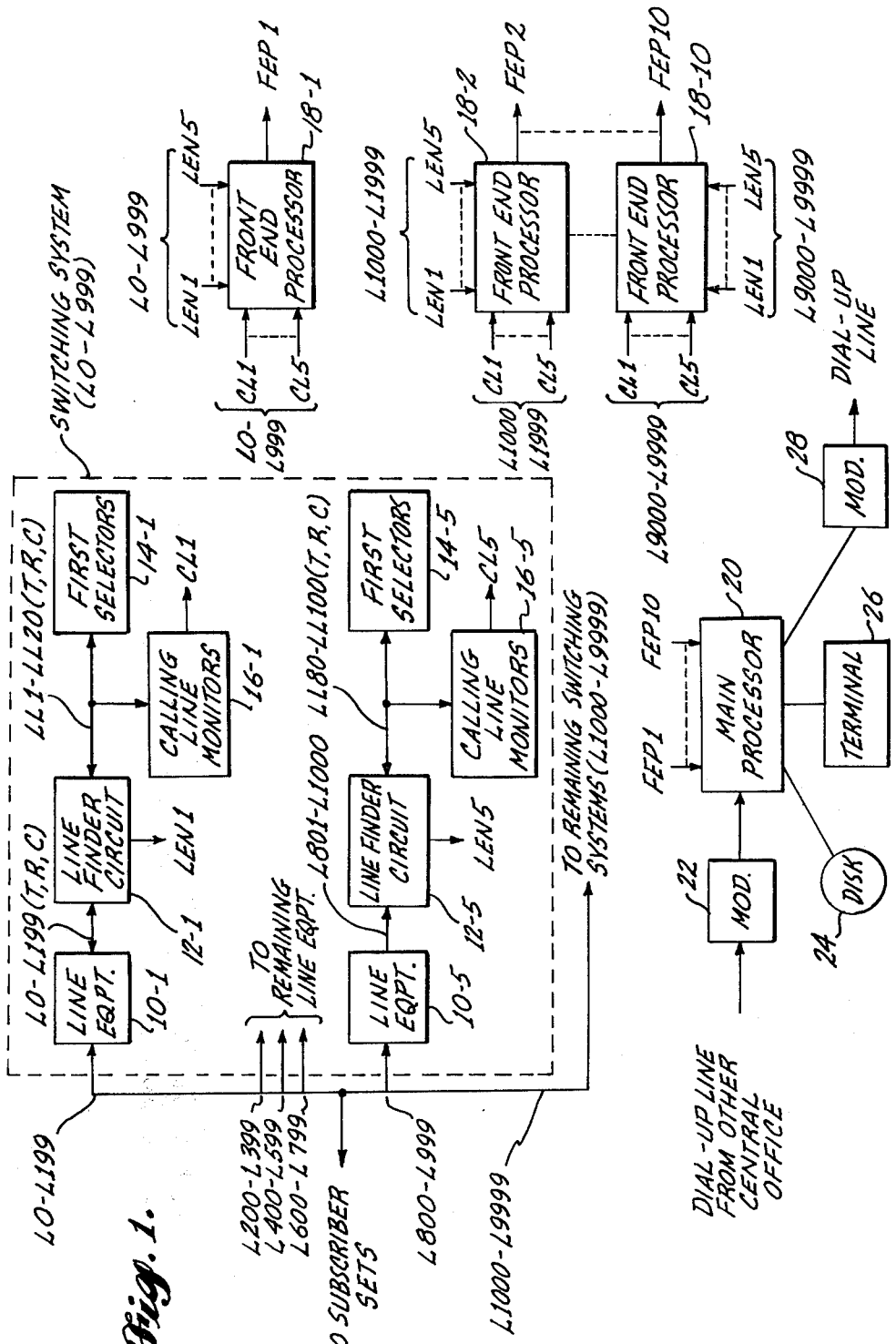
FIG. 1 is a block diagram of a central office including typical electromechanical step-by-step switching systems and a call data monitoring system including a plurality of calling line monitor groups, a plurality of front end processors, and a main processor.

Referring now to FIG. 1, a central office is illustrated which includes a plurality of one-thousand line switching systems for interconnecting ten thousand subscriber lines L0-L9999 with the telephone network. Only one of the switching systems (for lines L0-L999) is illustrated in detail and the remaining switching systems (for lines L1000-L9999) are identical in construction. Within the illustrated switching system, the subscriber lines are divided into two-hundred line groups and each two-hundred line group has associated therewith a corresponding set of line equipment, a line finder circuit, and a plurality of first selectors. Specifically, lines L0-L199 have associated therewith line equipment 10-1, line finder circuit 12-1 and first selectors 14-1, lines L200-L399, L400-L599, and L600-L799 have associated therewith corresponding line equipment, line finder circuits and first selectors (not illustrated), and lines L800-L999 have associated therewith line equipment 10-5, line finder circuit 12-5 and first selectors 14-5. Considering now the portion of the switching system associated with lines L0-L199, the tip (T) and ring (R) conductors of each of the lines L0-L199 are connected to corresponding line circuits in line equipment 10-1, and the T and R conductors of each line along with a control (C) conductor for each line are connected from the corresponding line circuit to line finder circuit 12-1. Within line finder circuit 12-1, the conductors of each line are connected to stationary contact banks of each of twenty line finders so that each line has a unique location in those stationary contact banks. Each line finder has movable contacts which are coupled to the T, R and C conductors of a corresponding one of lines LL1-LL20 going to first selectors 14-1. There are twenty first selectors in first selectors 14-1, and each first selector has movable contacts connected to the conductors of one of lines LL1-LL20.

When a subscriber having one of lines L0-L199 initiates a call by placing his instrument off-hook, the corresponding line circuit in line equipment 10-1 marks the unique location in each of the stationary contact banks in each of the line finders that corresponds to the calling subscriber line and actuates line finder circuit 12-1 so as to select one of the line finders therein. At this time, that one of lines LL1-LL20 that interconnects the selected line finder with its associated first selector is preseized. Line finder circuit 12-1 then causes the selected line finder to move its movable contacts until the marked unique location in its stationary contact banks is found, whereby line finder circuit 12-1 cuts-through the movable contacts of the selected line finder to complete seizure of that one of lines LL1-LL20 interconnecting the selected line finder with its associated first selector. As a result, a direct connection is made between the telephone instrument of the calling subscriber and the first selector through the corresponding line circuit in line equipment 10-1 and the selected line finder in line finder circuit 12-1, and dial tone is returned to the telephone instrument of the calling subscriber.

Thereafter, the call proceeds as the calling subscriber dials the telephone number of the called subscriber. Each digit of the dialed telephone number produces a corresponding sequence of dial pulses on the seized one of lines LL1-LL20. When a connection has been made with the called subscriber line through the first selector in first selectors 14-1 and the remaining portions of the telephone network and when the called subscriber places his instrument off-hook, the seized one of lines LL1-LL20 goes to an answer supervision condition and remains in that condition until either the called subscriber or the calling subscriber places his instrument on-hook. When the calling subscriber places his instrument on-hook, the corresponding line circuit in the line equipment 10-1 also causes line finder circuit 12-1 to release the selected line finder.

For call data monitoring, a front end processor is provided for each one-thousand line switching system. Specifically, front end processor 18-1 is provided for the illustrated switching system (lines L0-L999), and front end processors 18-2 ... 18-10 are provided for the remaining switching systems (lines L1000-L9999). Considering now the illustrated switching system, front end processor 18-1 receives signals LEN1 ... LEN5 from line finder circuits 12-1 ... 12-5. A plurality of calling line monitor groups 16-1 ... 16-5 are also provided, one for each two-hundred line group of the switching system. Each calling line monitor group includes twenty calling line monitors, one for each line finder-first selector line in the associated two-hundred line group. For examine, calling line monitor group 16-1 includes twenty monitors, one for each of lines LL1-LL20. Each calling line monitor is constructed so as to detect the voltage across the T and R conductors of its associated line finder-first selector line and to provide an output signal representing that voltage. The output signals from the calling line monitors in each group (collectively referred to as CL1 ... CL5) are also supplied to front end processor 18-1. The calling line monitors in each group (e.g., group 16-1) for each two-hundred line group (e.g., lines L0-L199) preferably are mounted on a single circuit card along with suitable signal conditioning circuits for the corresponding signals (e.g., signals LEN1) from the corresponding line finder circuit (e.g., circuit 12-1) for the group.

As will be explained in more detail hereinafter with reference to FIGS. 2-6, each of signals LEN1 ... LEN5 is an existing set of signals within the associated line finder circuit 12-1 ... 12-5 that represents the marked unique location of the selected line finder within the associated line finder circuit. For each two-hundred line group, the information represented by corresponding signals LEN1 ... LEN5 and information as to which of the associated line finder-first selector lines has been seized (which information identifies the selected line finder) that is contained in corresponding signals CL1 ... CL5 is used by front end processor 18-1 (by reference to an internal look-up table) to determine the units, tens and hundreds of the line number of the calling subscriber line in the two-hundred line group. Front end processor 18-1 then adds the thousands digit of the line number (which is the same for all lines associated with the front end processor) and stores the line number as a first item of a call data record. By monitoring the output signal from the calling line monitor corresponding to the seized line finder-first select line, front end processor 18-1 detects the successive dial pulse sequences on the seized line. Front end processor 18-1 converts these dial pulse sequences into the telephone number of the called subscriber (including area code if a long-distance call) and stores this telephone number as a second item in the call data record. By further monitoring the output signal from the corresponding calling line monitor, front end processor 18-1 detects answer supervision. At the start of answer supervision, front end processor obtains real-time from a real-time clock (not illustrated) to determine the start time of the call and starts an internal timer. At the end of answer supervision, front end processor stops its internal timer so that the time therein represents the duration of the call. The start time and duration are stored as third and fourth items in the call data record.

In order to provide centralized storage and further processing of call data records, a main processor 20 is provided at the central office which receives signals FEP1 ... FEP10 from front end processors 18-1 ... 18-10 via standard data links (such as RS 232 data links). Main processor 20 may also receive similar signals from front end processors in other central offices via one or more dial-up lines and one or more corresponding modems 22.

When each call has been completed, the front end processor monitoring that call transfers the call data record to main processor 20 via its data link. By referring to an internal look-up table, main processor 20 converts the line number in the call data record into the corresponding directory number of the calling subscriber and then stores the call record in an appropriate location in a disc 24 (or other storage device). It will be appreciated that disc 24 contains the call data records for all calls placed through the central office (and other central offices if desired). By using an input/output terminal 26 interconnected with main processor 20, an operator may review the operation of main processor 20 and may study any of the call data records in disc 24. At desired intervals, the storage medium within disc 24 is removed and manually transported to another location for billing processing, or, the call data records in disc 24 are transferred by main processor 20 to another location for billing processing via a modem 28 and a dial-up line.

Figure 2:
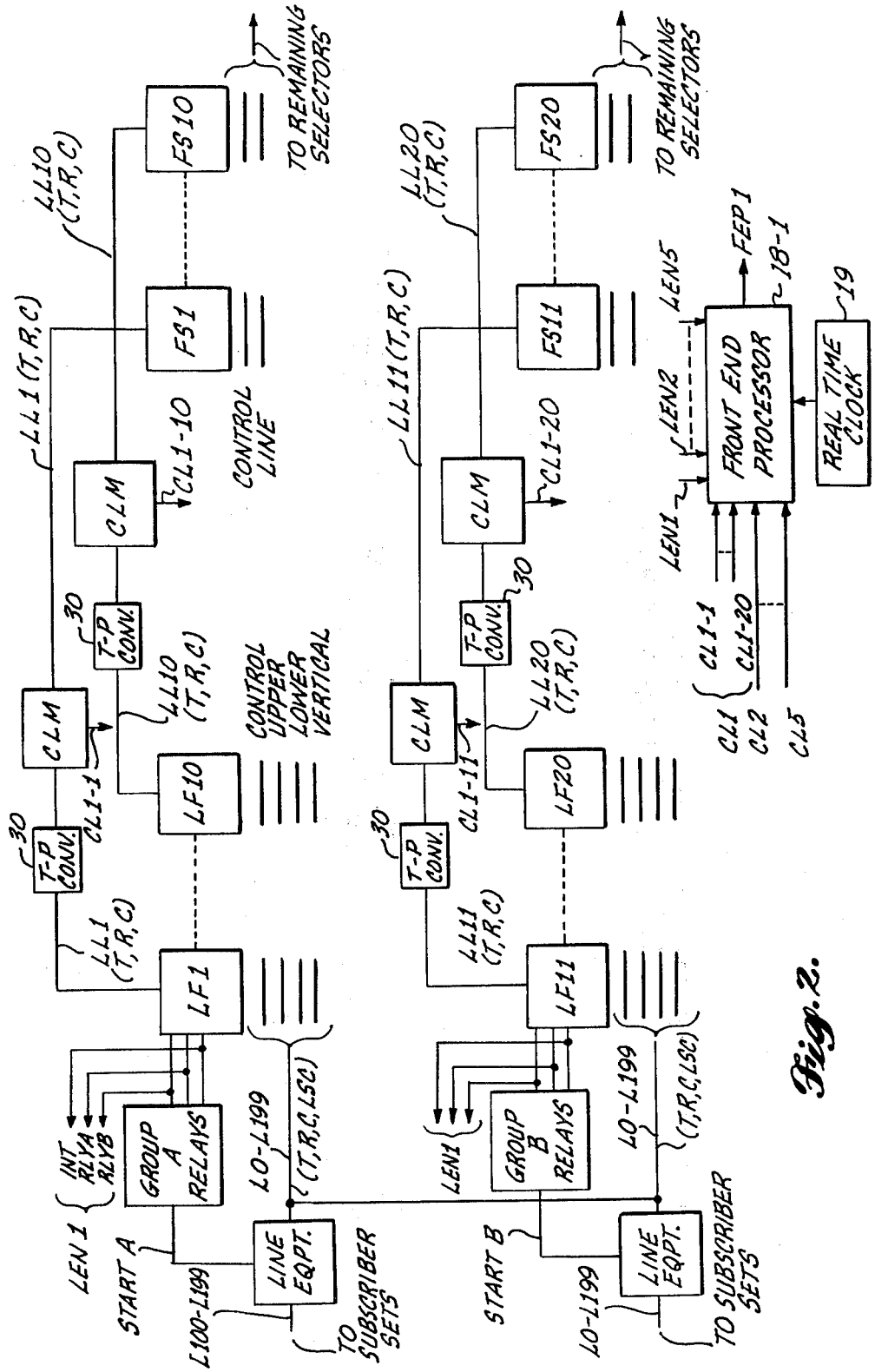
FIG. 2 is a block diagram of one of the switching systems in FIG. 1 and the associated calling line monitors and front end processor.

In FIG. 2, an expanded block diagram of a portion of the illustrated switching system in FIG. 1 (line equipment 10-1, line finder circuit 12-1, first selectors 14-1 and calling line monitor group 16-1) associated with one of the two-hundred line groups (lines L0–L199) is set forth. In the two-hundred line group, the lines are divided into group A (lines L100–L199) and group B (lines L0–L99). The upper half of the diagram in FIG. 2 illustrates that portion of the switching system normally associated with the group A lines, and the lower half of the diagram in FIG. 2 illustrates that portion of the switching system normally associated with the group B lines. The T and R conductors of the group A lines are connected to line equipment 10-1A which includes a plurality of line circuits, one for each line. Each of these line circuits is interconnected with a common set of control relays for the group A lines (the group A relays) by a START A lead. Likewise, the T and R conductors of the group B lines are connected to line equipment 10-1B which includes a plurality of line circuits, one for each line. Each of these line circuits is interconnected with a common set of control relays for the group B lines (the group B relays) by a START B lead. From line equipment 10-1A and 10-1B, the T, R, C, and second control (LSC) conductors of each line are connected to the stationary contact banks of line finders LF1 . . . LF10 for group A and line finders LF11 . . . LF20 for group B. The group A relays are interconnected (through a distributor, not illustrated) with line finders LF1 . . . LF10 and line finders LF11–LF20 by leads including leads INT, RLYA, RLYB and the group B relays are interconnected (through a distributor, not illustrated) with line finders LF1 . . . LF10 and LF11 . . . LF20 by leads including leads INT, RLYA and RLYB. The signals on leads INT, RLYA, and RLYB comprise signals LEN1 representing the marked unique location in the selected line finder and are supplied to front end processor 18-1 as previously described.

The movable contacts of each line finder are coupled to the movable contacts of the associated first selector via the T, R and C conductors of a line finder-first selector line. Accordingly, line finders LF1 . . . LF10 are interconnected with first selectors FS1 . . . FS10 by lines LL1 . . . LL10, and line finders LF11 . . . LF20 are interconnected with first selectors FS11 . . . FS20 by lines LL11 . . . LL20. If the central office is equipped for tone dialing, then a tone-to-pulse converter 30 is located in each of lines LL1 . . . LL10 and LL11 . . . LL20. At a point in each line finder-first selector line between the tone-to-pulse converter 30 and the associated first selector, one of the calling line monitors is connected to the T and R conductors of the line. Accordingly, calling line monitors CLM1 . . . CLM10 are interconnected with lines LL1 . . . LL10 and provide corresponding output signals CL1-1 . . . CL1-10, and calling line monitors CLM11 . . . CLM20 are interconnected with lines LL11 . . . LL20 and provide corresponding output signals CL1-11 . . . CL1-20. Output signals CL1-1 . . . CL1-10 and CL1-11 . . . CL1-20 collectively comprise output signal CL1 which is supplied to front end processor 18-1 as previously described.

Figure 3:
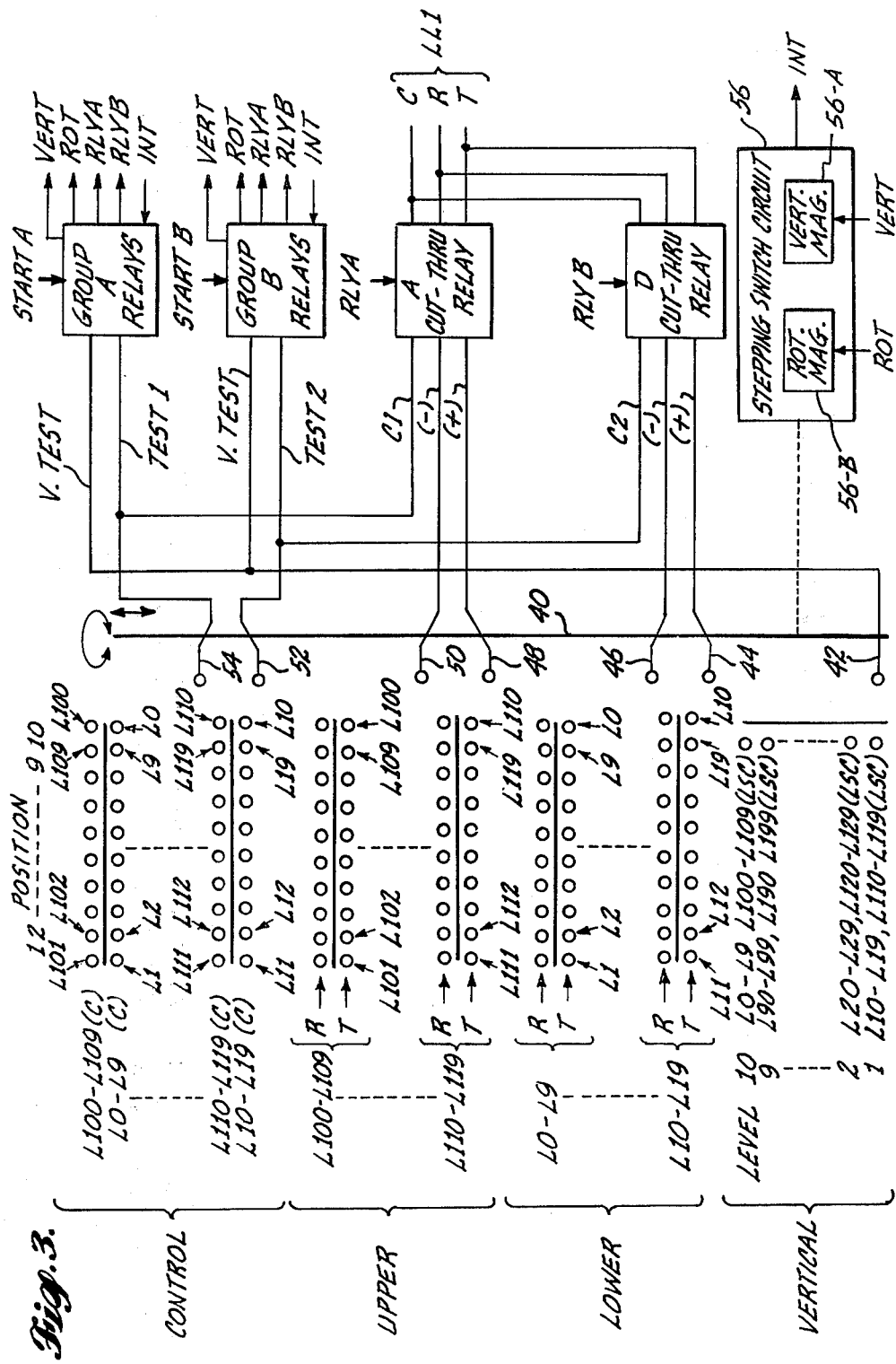
FIG. 3 is a schematic and block diagram of a line finder and associated relays in the switching system of FIG. 2.

In FIG. 3, one of the line finders (e.g., LF1) and its associated interconnections with the group A relays and the group B relays are illustrated. The line finder includes four stationary contact banks labelled CONTROL, UPPER, LOWER and VERTICAL. The VERTICAL bank includes ten vertically-disposed and horizontally-aligned contacts, with each contact denoting a vertical level (LEVEL) of the line finder. Each LOWER, UPPER and CONTROL bank includes ten vertical levels of contact sets, with the vertical level of each such contact set corresponding to the vertical level of one of the contacts in the VERTICAL bank. Each contact set (or vertical level) includes ten horizontally-disposed contact pairs, with the horizontal positions of corresponding contact pairs in the LOWER, UPPER and CONTROL banks being vertically aligned. If the horizontally-disposed contact pairs in these banks were to be viewed in a plane normal to that of FIG. 3, it would be seen that the contact pairs are horizontally disposed along a semicircle.

The line finder also includes a shaft 40 which is support for vertical and rotary (or horizontal) movement relative to the stationary contact banks. Mounted on shaft 40 are a wiper 42 bearing a movable contact for engaging one of the contacts in the VERTICAL bank, wipers 44 and 46 bearing contacts for respectively engaging the lower and upper contacts in each contact pair in a vertical level in the LOWER bank, wipers 48 and 50 bearing contacts for respectively engaging the lower and upper contacts in each contact pair in a vertical level in the UPPER bank, and wipers 52 and 54 bearing contacts for respectively engaging the lower and upper contacts in each contact pair in a vertical level in the CONTROL bank.

Normally, shaft 40 is maintained in a rest position (by means not illustrated) wherein the movable wiper contacts do not engage any of the stationary contacts in the VERTICAL, LOWER, UPPER and CONTROL banks. In the rest position, the movable contact on wiper 42 is just below the lowest vertical contact in the VERTICAL bank (LEVEL 1) and the movable contacts on wipers 44 and 46, 48 and 50, and 52 and 54 are respectively just below the lowest vertical level (LEVEL 1) in the corresponding LOWER, UPPER and CONTROL banks and just to the left (as viewed in FIG. 3) of that level. During a line-finding operation, the vertical level and rotary position of shaft 40 are controlled by a vertical magnet 56-A and a rotary magnet 56-B within a stepping switch circuit 56. Shaft 40 is returned to its rest position when the call has been completed by the operation of a release magnet (not illustrated) within stepping switch circuit 56. The line-finding operation is accomplished by signals on leads VERT and ROT to the vertical magnet 56-A and the rotary magnet 56-B from either the group A relays or the group B relays and by signals on lead INT from stepping switch circuit 56 to the group A relays and the group B relays, as described in detail hereinafter.

Considering now the VERTICAL bank, the LSC conductors of a first set of ten lines in each of groups A and B (lines L10–L19, L110–L119) are connected to the lowermost contact in that bank (LEVEL 1), the LSC conductors of a second set of ten lines in each of groups A and B (lines L20–L29, L120–L129) are connected to the next contact in that bank (LEVEL 2), the LSC conductors in other sets of ten lines in each of groups A and B (lines L30–L99 and L130–L199) are connected to progressively ascending contacts in that bank (LEVEL 3-LEVEL 9), and the LSC conductors in the remaining set of ten lines in each of groups A and B (lines L0–L9, L100–L109), are connected to the uppermost contact in that bank (LEVEL 10).

Considering now the LOWER bank, the R and T conductors of each line in a set of ten lines in the group B lines are connected to the upper and lower contacts of a contact pair in the vertical level corresponding to the vertical level for that set in the VERTICAL bank. As examples, the R and T conductors of lines L10–L19 are connected to the contact pairs in LEVEL 1 of the LOWER bank and the R and T conductors of lines L0–L9 are connected to the contact pairs in LEVEL 10 of the LOWER bank. Within each vertical level, the R and T conductors of the lines in the ten-line set are connected to the contact pairs in a predetermined rotary order in which the R and T conductors of the next-to-lowest line in the set are connected to the leftmost contact pair (POSITION 1), the R and T conductors of higher-numbered lines in the set are connected in sequence to the contact pairs going from left to right, and the R and T conductors of the lowest-numbered line in the set are connected to the rightmost contact pair. As an example for LEVEL 1, the conductors of line L11 are connected to the leftmost contact pair, the conductos of line L12 are connected to the next-to-leftmost contact pair, the conductors of line L19 are connected to the next-to-rightmost contact pair, and the conductors of line L10 are connected to the rightmost contact pair.

Considering now the UPPER bank, the R and T conductors of each line in a set of ten lines in the group A lines are connected to the upper and lower contacts of a contact pair in the vertical level corresponding to the vertical level for that set in the VERTICAL bank, in a manner identical to that described for the LOWER bank. Likewise, the R and T conductors of the lines in each set are connected to the contact pairs in the corresponding vertical level in the same rotary order as previously described for the LOWER bank.

Considering now the CONTROL bank, the C conductors in each set of ten lines in the group B lines are connected to the lower contacts in a vertical level corresponding to the vertical level of that set in the VERTICAL bank and the C conductors in each set of ten lines in the Group A lines are connected to the upper contacts in a vertical level corresponding to the vertical level of that set in the VERTICAL bank. As examples, the C conductors of lines L10–L19 connected to the lower contacts in LEVEL 1 of the CONTROL bank, the C conductors of lines L110–L119 are connected to the upper contacts in LEVEL 1 of the CONTROL bank, the C conductors of lines L0–L9 are connected to the lower contacts in LEVEL 10 of the CONTROL bank, and the C conductors of lines L100–L109 are connected to the upper contacts in LEVEL 10 of the CONTROL bank. Within each vertical level, the C conductors in the corresponding sets are connected to the contacts in the rotary order previously discussed for the UPPER and LOWER banks. As an example for LEVEL 1, the C conductor of line L11 is connected to the leftmost lower contact, the C conductor of line L12 is connected to the next-to-leftmost lower contact, the C conductor of line L19 is connected to the next-to-rightmost lower contact, and the C conductor of line L10 is connected to the rightmost lower contact.

From the foregoing description, it will be appreciated that the conductors of each line in the group A lines are terminated in contacts having a unique vertical level and rotary position in the VERTICAL, UPPER and CONTROL banks and that the conductors of each line in the group B lines are terminated in contacts having a unique vertical level and rotary position in the VERTICAL, LOWER and CONTROL banks. As will be seen from the description hereinafter, each unique vertical level is marked by a signal on one of the contacts in the VERTICAL bank and each unique rotary position is marked by a signal on one of the contacts in the corresponding vertical level in the CONTROL bank.

The movable contact on wiper 42 is connected by a lead V.TEST to the group A relays and the group B relays. The movable contact on wiper 54 and the movable contact on wiper 52 (for the CONTROL bank) are connected by leads TEST 1 and TEST 2 to the group A relays and the group B relays, respectively. The movable contacts on wipers 54 and 52 are also connected by leads C1 and C2 to an A cut-through relay and a D cut-through relay, respectively, in the line finder. The movable contacts on wipers 50 and 48 are connected by leads (−) and (+) to the A cut-through relay, and the movable contacts on wipers 46 and 44 are connected by leads (−) and (+) to the D cut-through relay. The A cut-through relay and the D cut-through relay are normally open and respond to signals on leads RLYA and RLYB from the group A relays and the group B relays to respectively connect the C1, (−), and (+) leads and the C2, (−), and (+) leads with the C, R and T conductors of the line finder-first selector line (LL1).

Figure 4:
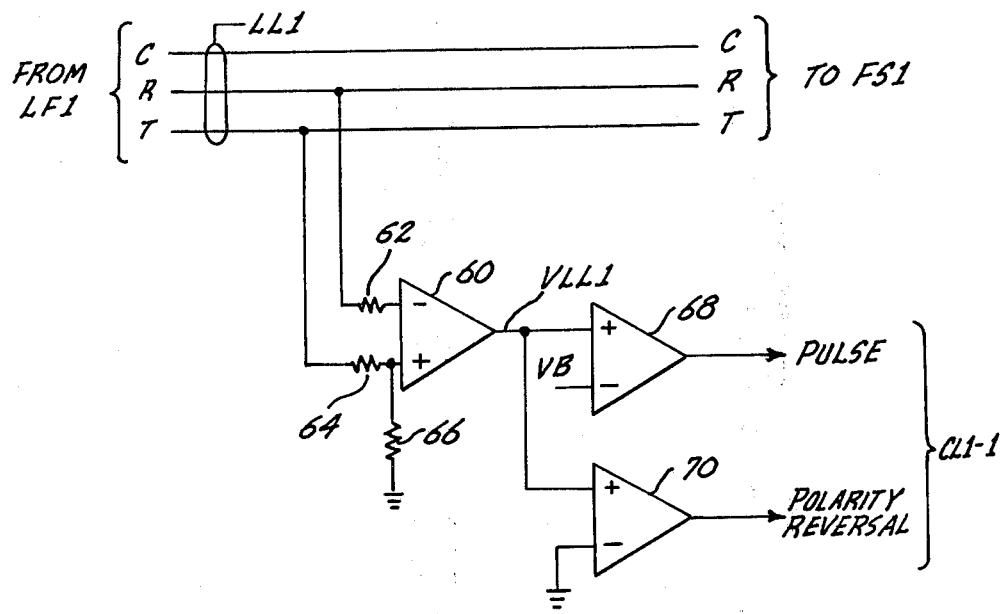
FIG. 4 is a block diagram of one of the calling line monitors.

In FIG. 4, the calling line monitor CLM1 for line LL1 is illustrated. The R conductor of line LL1 is coupled to the inverting input of a differential amplifier 60 through a resistor 62, the T conductor of line LL1 is coupled to the noninverting input of differential amplifier 60 through a resistor 64, and resistor 66 is connected from the noninverting input of differential amplifier 60 to ground potential. Accordingly, the potential at the inverting input of differential amplifier 60 is related to the potential on the R conductor of line LL1 and the potential at the noninverting input of differential amplifier 60 is related to the potential on the T conductor of line LL1. The output signal VLL1 from differential amplifier 60 is therefore related to the voltage across the R and T conductors of line LL1 and is supplied to the noninverting inputs of comparators 68 and 70. The central office battery voltage VB is supplied to the inverting input of comparator 68, and ground potential is supplied to the inverting input of comparator 70. Depending on whether the voltage of output signal VLL1 is above or below the central office battery voltage VB, an output signal PULSE from comparator 68 has either a first logic level or a second logic level.

Depending on whether the voltage of output signal VLL1 is above or below ground potential, an output signal POLARITY REVERSAL from comparator 70 has a first logic level or a second logic level.

As will be described, the logic levels of PULSE and POLARITY REVERSAL can be monitored to determine seizure and release of line LL1, dial pulses thereon, and answer supervision.

Figure 5:
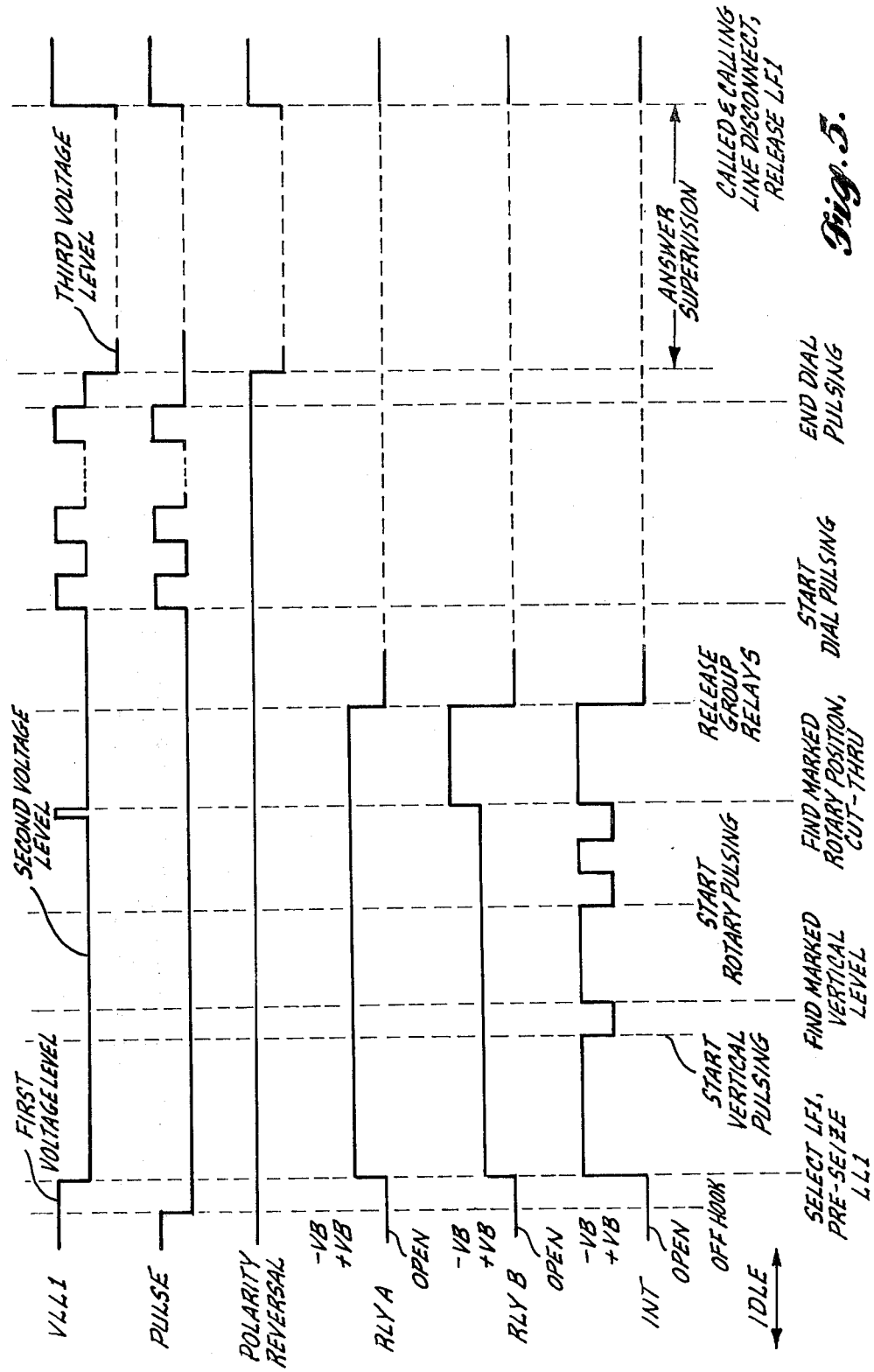
FIG. 5 is a timing diagram illustrating the method of call data monitoring.
Figure 7A:
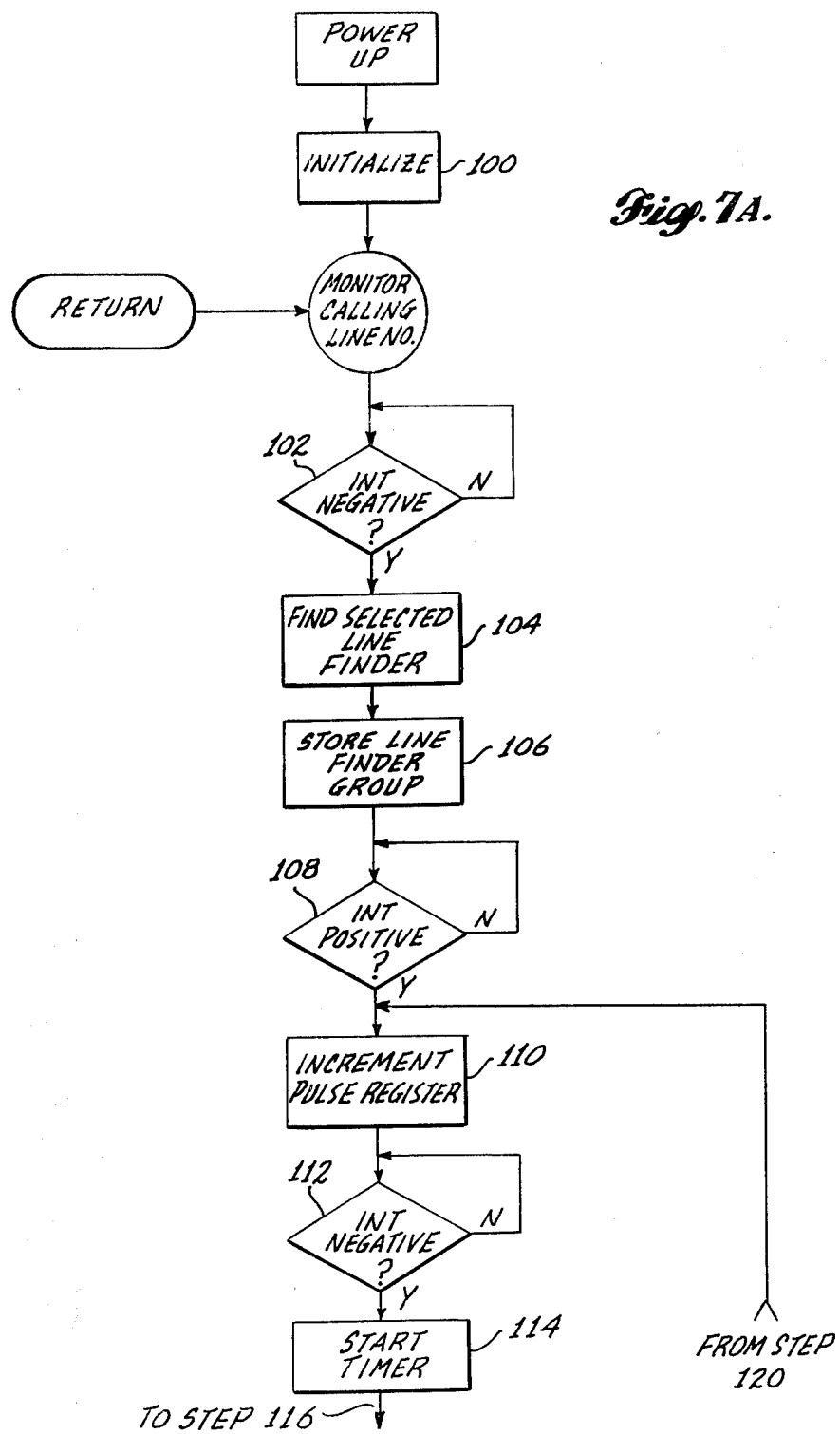
Figure 7B:
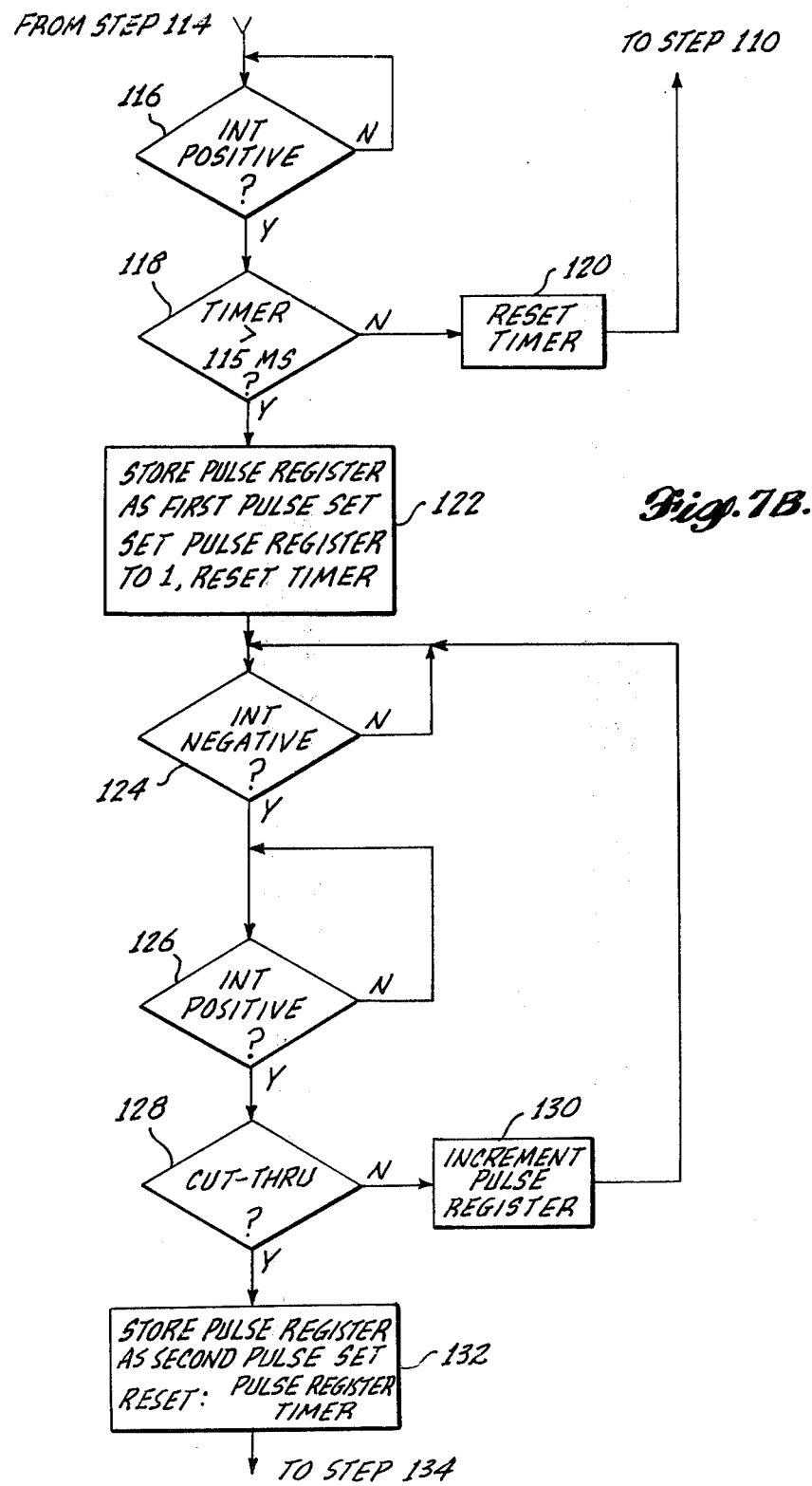
Figure 7C:
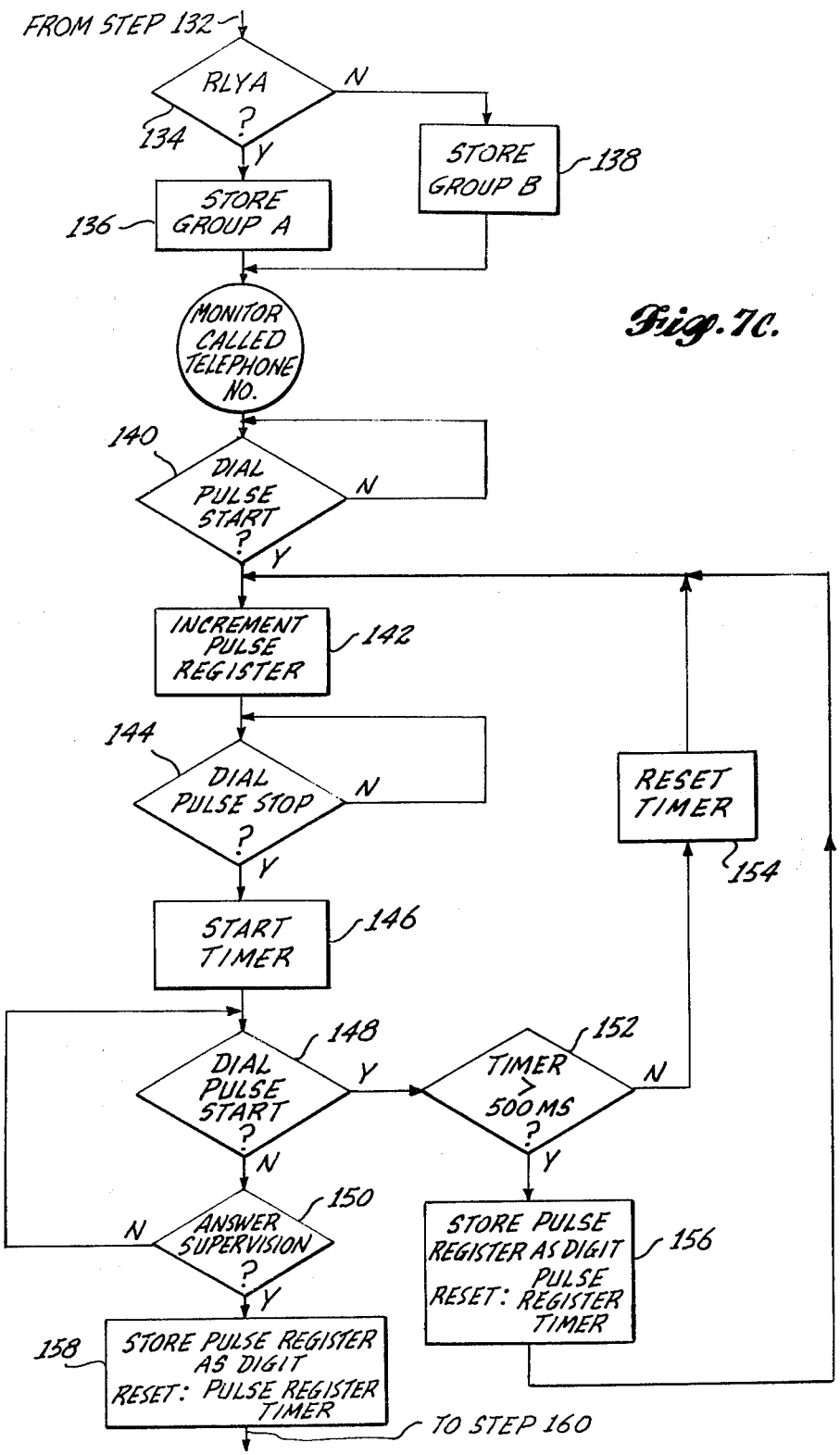
Figure 7D:
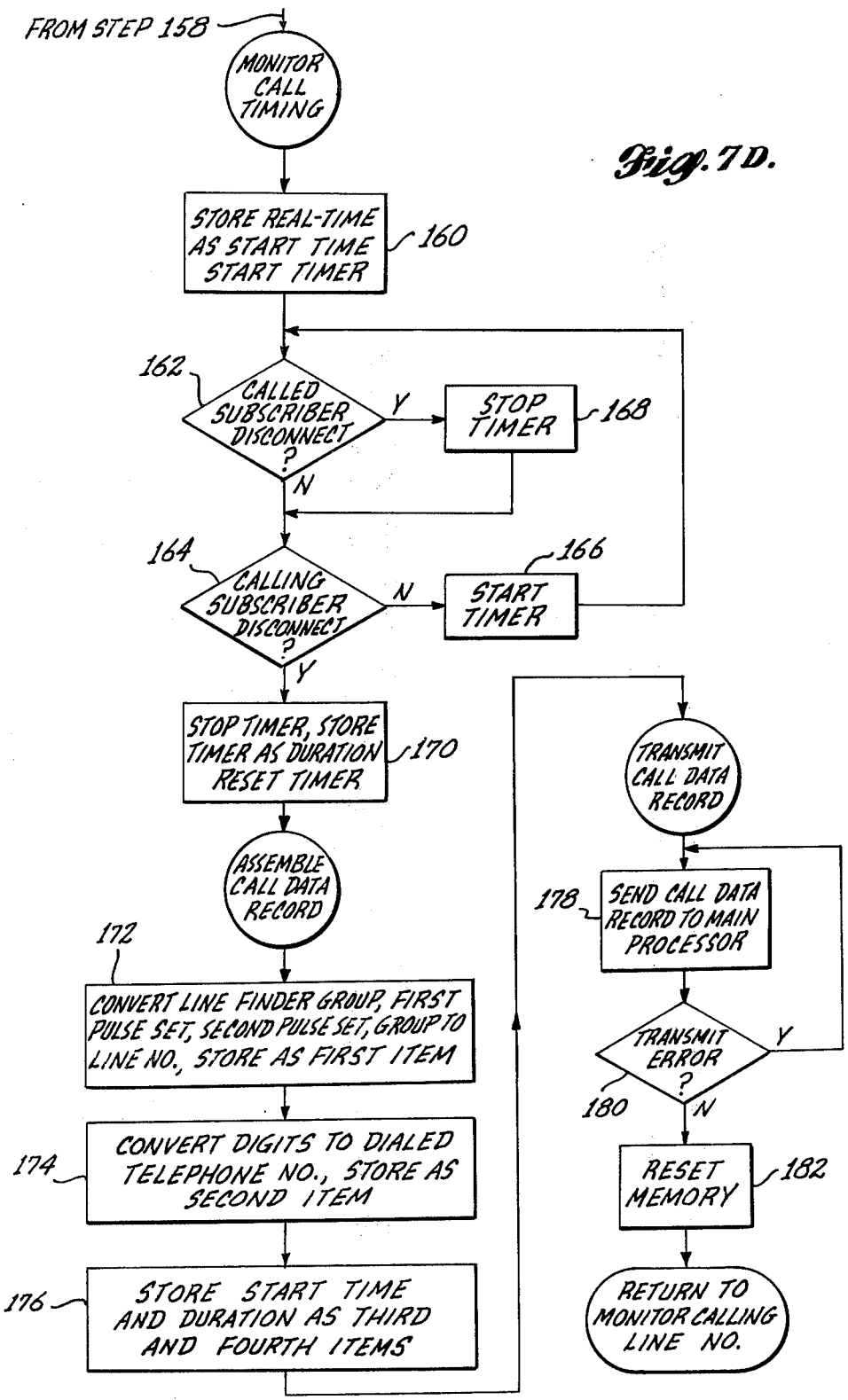

Taking into consideration this description of the structure of the switching system and of the signals that are monitored by front end processor 18-1, the overall operation of front end processor 18-1 in providing call data monitoring for a call placed through the switching system from subscriber line L12 will be described with reference to the timing diagram in FIG. 5.

When the subscriber at line L12 lifts the handset of his telephone instrument, the corresponding line circuit in line equipment 10-1B applies a ground via the LSC conductor of the line to the corresponding contact in the VERTICAL bank in each of line finders LF1 ... LF10, LF11 ... LF20 to thereby mark a vertical level in the line finders, applies a ground via the C conductor of the line to the corresponding contact in the CONTROL bank in each of the line finders to thereby mark a rotary position in the line finders, and applies a ground via lead START B to the group B relays. In response to the ground on lead START B, the group B relays attempt to select one of line finders LF11 ... LF20. Let it be assumed that line finders LF11 ... LF20 are all busy or otherwise unavailable so that the group B relays then attempt to select one of line finders LF1 ... LF10 and in fact select line finder LF1. At times before the selection of line finder LF1, line LL1 is in an idle condition in which $-$VB is applied to the R conductor thereof and ground potential is applied to the T conductor thereof, with the terminations of line LL1 being open. During the idle condition, the voltage of output signal VLL1 in calling line monitor CLM1 is accordingly at a first voltage level. At the time that line finder LF1 is selected, line LL1 is preseized by applying a shunt thereto which reduces the voltage across the T and R conductors thereof so that output signal VLL1 drops to a second voltage level. At this time, output signal PULSE changes from a first logic level to a second logic level to thereby signify to front end processor 18-1 that line LL1 has been preseized and that the calling subscriber line is being found through line finder LF1.

At the time that line finder LF1 is selected, the group B relays also cause the signals on leads RLYA, RLYB, and INT to go from an open level to +VB. Shortly thereafter, the group B relays start vertical stepping of line finder LF1 by applying a ground on lead VERT which causes vertical magnet 56-A to raise the vertical level of shaft 40 and the wipers thereon by one vertical step (e.g., from the rest position to LEVEL 1). To signify to the group B relays that a step in vertical level has been effected, stepping switch circuit 56 causes the signal on lead INT to go from $-$VB to $+$VB for a predetermined period of time. The group B relays then determine if a ground appears on lead V.TEST to determine if the vertical level thus stepped to is the marked vertical level. In the situation being described, a ground does appear on the contact in the VERTICAL bank corresponding to LEVEL 1 so that the group B relays are informed that the marked vertical level has been found. Following the time that the marked vertical level has been found, the signal on lead INT remains at $-$VB for a predetermined period of time as the group B relays prepare to start rotary stepping. Through monitoring the signal on lead INT, front end processor 18-1 is therefore informed that one pulse in a first pulse set was required to step to the marked vertical level (thereby indicating LEVEL 1).

Upon termination of the predetermined period following the time that the marked vertical level was found, the group B relays provide a ground on lead ROT which causes rotary magnet 56-B to rotate shaft 40 and the wipers thereon by one rotary step (e.g., from the rest position to POSITION 1). As was the case for vertical stepping, stepping switch circuit 56 causes the signal on lead INT to go from $-$VB to $+$VB for a predetermined period of time to signify that a rotary step has been effected. The group B relays then determine if a ground is present on TEST 2 to determine if the marked rotary position has been found. In the situation being described, a ground does not appear on TEST 2 when shaft 40 and the wipers thereon are at POSITION 1 so that the group B relays again provide a signal on lead ROT which causes rotary magnet 56-B to step shaft 40 and the wipers thereon to the next rotary position, whereupon the signal on lead INT again goes from $-$VB to $+$VB for a predetermined period of time. In the situation being described, a ground is returned on TEST 2 when shaft 40 and the wipers thereon are at POSITION 2 to indicate that the marked rotary position has been found. Shortly after this time, the group B relays cause the signal on lead RLYB to go from $+$VB to $-$VB to accordingly actuate the D cut-through relay so that line L12 is connected to line LL1 through the line circuit in line equipment 10-1B, the CONTROL and LOWER banks in line finder LF1, movable contacts 52, 46, and 44, and the D cut-through relay. The signal on lead RLYA, however, remains at $+$VB. Through monitoring the signal on lead INT, front end processor 18-1 is informed that two pulses in a second pulse set were required to step to the marked rotary position (thereby indicating POSITION 2). Through monitoring which of the signals on leads RLYA and RLYB first went to $-$VB following the time that the marked rotary position was found, front end processor 18-1 is informed that the line finder was being controlled by the group B relays.

Using the information thus obtained as to the selected line finder, the group relays controlling the selected line finder, the number of pulses in the first pulse set on lead INT, and the number of pulses in the second pulse set on lead INT, front end processor 18-1 converts this information into the corresponding line number by reference to a look-up table such as that illustrated in FIG. 6, and stores the line number as a first item in a call data record. From FIG. 6, it will be seen that if the calling subscriber line is line L12 and if any of the group A line finders have been selected (including line finder LF1), the calling subscriber line is identified by group B relay control, one pulse in the first pulse set, and two pulses in the second pulse set. From FIG. 6, it will also be seen that if the calling line is line L12 and if one of the group A line finders has been selected (LF11–LF20), the calling subscriber line is identified by group B relay control, ten pulses in the first pulse set, and two pulses in the second pulse set (due to differing connections of the lines to the stationary contact banks in the group B line finders).

At the time subscriber line L12 is cut-through to line LL1, the following actions occur. First, the shunt across line LL1 is removed and replaced by the shunt of the telephone instrument of the calling subscriber. As a result, a short spike appears in output signal VLL1 (and in signal PULSE) as the voltage across the R and T conductors of line LL1 adjusts to the changing impedance thereacross, and output signal VLL1 returns substantially to the second voltage level following this spike. Second, the line finder is maintained at its marked vertical level and rotary position and the D cut-through relay is maintained actuated by the ground on the C conductor of line L12 provided by the corresponding line circuit. Third, dial tone is returned to the telephone instrument of the calling subscriber via line L12.

At a time subsequent to cut-through, the group B relays are released whereby the signals on leads RLYA, RLYB, and INT each return to the open level. Thereafter, the group B relays are available for selecting another line finder upon the initiation of the placement of a call on one of the remaining subscriber lines on the group B lines.

After receiving dial tone, the calling subscriber dials the telephone number of the called subscriber. Each digit of the dialed telephone number results in a corresponding sequence of dial pulses on line LL1 so that output signal VLL1 goes from the second voltage level to the first voltage level during each dial pulse. Correspondingly, output signal PULSE goes from its second logic level to its first logic level during each dial pulse. The dial pulse information in PULSE is monitored by front end processor 18-1 which then converts the number of pulses in each sequence to a corresponding digit of the dialed telephone number and stores the dialed telephone number as a second item in the call data record.

At a time when a connection has been made between line LL1 and the called subscriber line through the telephone network and the called subscriber places the handset of his instrument off-hook, answer supervision is provided through the telephone network which reverses the polarity of the R and T conductors of line LL1, i.e., the R conductor goes to ground potential and the T conductor goes to $-VB$. As a result, output signal VLL1 drops to a third voltage level, and in doing so, passes through ground potential, whereby output signal POLARITY REVERSAL changes from a first logic level to a second logic level. This logic level change is detected by the front end processor 18-1 to signify the initiation of the call. At this time, front end processor 18-1 obtains real-time from a real-time clock 19 (FIG. 2) which accumulates real-time by seconds, minutes, hours, and days of a week to determine the start time of the call which is stored as a third item on the call data record. Also at this time, front end processor 18-1 starts an internal timer to record the duration of the call. At a time when the called party replaces the handset of his telephone instrument, answer supervision terminates and the voltage of output signal VLL1 returns to either the first voltage level or the second voltage level depending on whether the calling subscriber has or has not replaced the handset of his telephone instrument. At a time when the calling subscriber goes on-hook (which may be previous to the time that the called subscriber goes on-hook), output signals PULSE and POLARITY REVERSAL return to the first logic level to signify to front end processor 18-1 that the call has terminated. At this time, front end processor 18-1 stops its internal timer and stores the time accumulated therein as a fourth item in the call data record. Also at this time, the corresponding line circuit removes ground from the C conductor of line L12 to deactuate the D cut-through relay and release line finder LF1 (through a release magnet, not illustrated), so that line finder LF1 returns to its rest position.

The detailed operation of front end processor 18-1 in monitoring call data for a single call, assembling a corresponding call data record, and transmitting the call data record to main processor 20 will now be described with reference to the flowchart of a main program used by front end processor 18-1 as illustrated in FIGS. 7A–7D.

The processor detects a POWER UP condition on application of power to the processor and enters an INITIALIZE routine 100 in which all registers and timers in the processor to be described hereinafter are reset (to zero) and in which the processor request real-time from the main processor 20 and accordingly sets its real-time clock 19. Thereafter, the processor enters a MONITOR CALLING LINE NO. routine in which the line number of the calling subscriber line is determined. In step 102, the processor waits until the signal on lead INT goes negative (to $-VB$). When the determination in step 102 is affirmative to signify that one of the calling subscribers has placed the handset of his telephone instrument off-hook and that one of the line finders has been selected, the processor (in step 104) finds the selected line finder by determining which output signal PULSE in which of output signals CL1-1 . . . CL1–20 from calling line monitors CLM1 . . . CLM20 has gone from the first voltage level to the second voltage level. After having made this determination, the processor (in step 106) stores an indication of the corresponding line finder group (LF1 . . . LF10 or LF11 . . . LF20) in memory.

In step 108, the processor waits until the signal on lead INT goes from negative to positive (from $-VB$ to $+VB$). When the determination in step 108 is affirmative, vertical stepping of the selected line finder has commenced so that the processor proceeds in step 110 to increment a PULSE register to thereby store an indication that there has been one pulse in the verticl stepping of the selected line finder. The processor then waits (in step 112) until the signal on lead to INT again goes negative (from $+VB$ to $-VB$). When the determination in step 112 is affirmative, the processor (in step 114) starts an internal timer (which is clocked by appropriate timing signals from real-time clock 19) and then proceeds to wait (in step 116) until the signal on lead INT again goes positive. When the determination in step 116 is affirmative, the processor (in step 118) determines if the time accumulated in the timer is greater than a predetermined maximum time (e.g., 115 milliseconds) corresponding to an expected interval between the termination of vertical stepping and the initiation of rotary stepping. If the determination in step 118 is negative, the fact that the signal on lead INT went positive denotes another vertical step of the selected line finder so that the processor proceeds (in step 120) to reset the timer and then returns to step 110 wherein the PULSE register is again incremented.

Incrementing of the PULSE register continues in the manner described until the determination in step 118 is affirmative. At this time, the fact that a signal on lead INT has gone positive indicates that rotary stepping has commenced, whereupon the processor proceeds (in step 122) to store the contents of the PULSE register as a first pulse set in memory, to set the PULSE register to "1," and to reset the timer. The processor then waits (in step 124) for the signal on lead INT to go negative. When the determination in step 124 is affirmative, the processor then waits (in step 126) for the signal on lead INT to go positive. When the determination in step 126 is affirmative, the processor determines (in step 128) whether cut-through has occurred (by monitoring the signals on leads RLYA and RLYB to determine if either of those signals has gone negative). If the determination in step 128 is negative, the fact that the signal on lead INT has gone positive indicates that another rotary step has occurred, whereupon the processor (in step 130) increments the PULSE register and then returns to step 124.

Incrementing of the PULSE register then continues in the manner described until the determination in step 128 is affirmative. At this time, rotary stepping has terminated whereupon the processor (in step 132) stores the contents of the PULSE register as a second pulse set in memory and resets the PULSE register and the timer. The processor then determines (in step 134) whether the cut-through was under control of the group A relays (by monitoring the signal on lead to RLYA). If the determination in step 134 is affirmative, the processor (in step 136) stores an indication of group A relay control in memory, and if the determination in step 134 is negative, the processor (in step 138) stores an indication of group B relay control in memory.

From either step 136 or step 138, the processor then proceeds to a MONITOR CALLED TELEPHONE NO. routine wherein the dialed telephone number is determined. While proceeding through this routine, the processor monitors output signals PULSE and POLARITY REVERSAL from that calling line monitor connected to the seized line finder-first selector line.

The processor waits (in step 140) for a dial pulse to start by detecting when output signal PULSE goes from its second logic level to its first logic level. When the determination in step 140 is affirmative, the processor (in step 142) increments the PULSE register and then waits (in step 144) for the dial pulse to stop (by detecting when output signal PULSE goes from the first logic level to the second logic level). When the determination in step 144 is affirmative, the processor (in step 146) starts the timer and then determines if a successive dial pulse has started. If the determination in step 148 is negative, it could be that all dial pulse sequences have occurred whereupon the processor (in step 150) determines if answer supervision has occurred (by detecting whether output signal POLARITY REVERSAL has gone from the first logic level to the second logic level). If the determination in step 150 is negative, the processor returns to step 148.

Let it now be assumed that only a first dial pulse has ocurred. At the next dial pulse starts, the determination in step 148 is affirmative whereupon the processor (in step 152) determines if the time accumulated in the timer is greater than a predetermined maximum time (e.g., 500 milliseconds) corresponding to an expected separation between successive digits of the dialed telephone number. If the determination in step 152 is negative, the processor (in step 154) resets the timer and then returns to step 142 wherein the PULSE register is incremented. For each dial pulse sequence, incrementing of the PULSE register continues in the manner described. Upon termination of any dial pulse sequence (excepting the last dial pulse sequence) and the start of the next dial pulse sequence, the determinations in steps 148 and 152 are each affirmative whereupon the processor proceeds (in step 156) to store the contents of the PULSE register as a digit in memory, and resets the PULSE register and timer, and then returns to step 142 wherein the PULSE register is incremented. Incrementing of the PULSE register and storage of the contents thereof as digits in memory continues to proceed in the manner described until the last dial pulse sequence has terminated (at which time the PULSE register will contain the number of pulses in the last sequence). At this time, the determination in step 148 is negative and the determination in step 150 is also negative if answer supervision has not initiated, whereupon the processor continues to loop through steps 148 and 150. When answer supervision is initiated, the determination in step 150 is affirmative whereupon the processor (in step 158) stores the contents of the PULSE register as a digit in memory and resets the PULSE register and the timer.

Thereafter, the processor proceeds to a MONITOR CALL TIMING routine wherein the start time of the call and the duration of the call are monitored. In step 160, the processor obtains real-time from the real-time clock 19 and stores this real-time as a start time in memory, and also starts the timer. The processor then determines (in step 162) whether the called subscriber has disconnected (by detecting whether output signal POLARITY REVERSAL has gone to the first logic level). If the determination in step 162 is negative, the processor (in step 164) determines if the calling subscriber has disconnected (by detecting whether output signal PULSE has returned to the first logic level). If the determination in step 164 is negative, the processor (in step 162) again starts the timer (in the event that the called subscriber has not disconnected, the timer has already been started in step 160) and then returns to step 162. Let it now be assumed that the called subscriber has disconnected and that the determination in step 162 is affirmative. The processor then (in step 168) stops the timer and then proceeds to determine (in step 164) if the calling subscriber has disconnected. If the determination in step 164 is negative, the processor starts the timer in step 166 and then continues to loop through steps 162, 168, 164 and 166 until the calling subscriber has disconnected. When the determination in step 164 is affirmative (which may occur either before or after the time that the called subscriber disconnected), the processor (in step 170) stops the timer, stores the contents of the timer as a duration in memory, and resets the timer.

Thereafter, the processor enters an ASSEMBLE CALL DATA RECORD routine in which a call data record for the call is assembled from the information stored in memory. In step 172, the processor converts the line finder group, the first pulse set, the second pulse set, and the group relay control in memory to the corresponding line number by reference to the look-up table (as described with reference to FIG. 6) and stores the line number as a first item in a call data record in memory. In step 174, the processor converts the digits in memory to the dialed telephone number and stores the dialed telephone number as a second item in the call data record in memory. In step 176, the processor stores the start time and the duration in memory as third and fourth items in the call data record in memory.

Thereafter, the processor enters a TRANSMIT CALL DATA RECORD routine in which the call data record thus assembled is transmitted to main processor 20. In step 178, the processor sends the call data record to the main processor via the associated data link. In step 180, the processor determines if a transmit error occurred, and, if so the processor returns to step 178 and continues to send the call data record until the determination in step 180 is negative. At this time, the processor (in step 182) resets its memory (to erase the information and call data record therein) and then returns to the MONITOR CALLING LINE NO. routine to await the initiation of another call.

In order to provide call data monitoring for a Stromberg-Carlson x-y step-by-step switching system, it is necessary to note that the subscriber lines connected to such a switching system are divided into one-hundred line groups. For each one-hundred line group, a line finder circuit is provided that includes ten line finders, each having an associated line finder line going to the remaining portions of the switching system, and a single set of common control relays. Upon detection of a calling subscriber line, line equipment marks a unique location in stationary contact banks in each line finder and the common control relays select one of the line finders and cause the selected line finder to move its movable contacts until the marked location in the stationary contact bank therein is found, in a manner very similar to that previously described for the Automatic Electric step-by-step switching system. The marked location in the selected line finder is detected by monitoring the signal on a control lead (lead PA) between the common control relays and the selected line finder that has present thereon first and second pulse sets respectively representing x and y stepping of the selected line finder and therefore the tens and units of the line number of the calling subscriber line. Identification of the hundreds and thousands of the line number is made from those assigned to the one-hundred line group, and the remaining call data monitoring is accomplished by monitoring the output signal from a calling line monitor connected to the line finder line associated with the selected line finder (in a manner similar to that described for the Automatic Electric step-by-step switching system).

In order to provide call data monitoring for an all-relay switching system (such as North Electric, Leich, and ITEC Electronic step-by-step), it is necessary to note that the subscriber lines connected to such a switching system are divided into one-hundred line groups. For each one-hundred line group, a line finder circuit is provided that includes a plurality of "line finders." Each line finder includes at least one "tens" relay and at least one "units" relay, with each of the subscriber lines in the group being terminated at a unique location in the "tens" relay and the "units" relay in each line finder, and each line finder is operative to couple one of the subscriber lines to an associated line finder line going to the remaining portion of the switching system (specifically, an associated link circuit). Upon detection of a calling subscriber line in the group, common control equipment for the group places a ground mark on one of ten "tens" leads going to the line finders and places a ground mark on one of ten "units" leads going to the line finders. After selection of one of the line finders by the common control equipment, these ground marks cause the "tens" relay and the "units" relay in the selected line finder to couple the calling subscriber line to the associated line finder line. Determination of a marked location in the line finders is accomplished by monitoring the "tens" leads and the "units" leads to accordingly determine the tens and units of the line number of the calling subscriber line.

This technique can also be used for the Automatic Electric and Stromberg-Carlson step-by-step switching systems previously described (e.g., the tens and units of the line number of the calling subscriber line can be determined by monitoring for ground marks on the C and LSC conductors from the line equipment to each of the line finders). Identification of the hundreds and thousands of the line number is made from those assigned to the one-hundred line group, and the remaining call data monitoring is accomplished by monitoring the output signal from a calling line monitor connected to the line finder line associated with the selected line finder (in a manner similar to that described for the Automatic Electric step-by-step switching system).

While the invention has been described with reference to a preferred embodiment, it is to be clearly understood by those skilled in the art that the invention is not limited thereto and the scope of the invention is to be interpreted only in conjunction with the appended claims.

The embodiments of the invention in which an exclusive property or privilege is claimed are defined as follows:

1. A method for determining the line number of a calling subscriber line in a group of subscriber lines connected to an electromechanical telephone switching system of a type consisting of step-by-step and all-relay switching systems, the switching system including: a plurality of line finders for the group, wherein each of the subscriber lines in the group is terminated at a unique location in each of the line finders and wherein each of the line finders is operative to couple one of the subscriber lines to an associated line finder line; and, common control equipment for the group that has connected thereto each of the subscriber lines in the group and that is connected to each of the line finders by a plurality of control leads, the common control equipment being operative to detect a calling subscriber line in the group, to responsively mark the location corresponding to the detected calling subscriber line in each line finder, to select one of the line finders whereupon the associated line finder line is seized, and to cause the selected line finder to find the marked location corresponding to the calling subscriber line, said method comprising the steps of:

detecting the marked location in the selected line finder by monitoring the signal on at least one of the control leads between the common control equipment and the selected line finder; and, converting the detected marked location into the line number of the calling subscriber line.

2. A method as recited in claim 1, for use with a step-by-step switching system in which: each line finder comprises stationary contact banks wherein each of the subscriber lines in the group is terminated at a unique location, and movable contacts for engaging the stationary contact banks to couple one of the subscriber lines to the associated line finder line; the common control equipment includes line equipment operative to detect a calling subscriber line in the group and to correspondingly mark the location corresponding to the calling subscriber line in the stationary contact banks in each line finder, and common control relays that are responsive to detection of a calling subscriber line in the group to select one of the line finders and to exchange signals with the selected line finder on the plurality of control leads so as to cause the selected line finder to move its movable contacts until the marked location corresponding to the calling subscriber line is found; the unique location at which each subscriber line is terminated in the stationary contact banks in each line finder is defined by a unique vertical level in a plurality of vertical levels and by a unique rotary position in a plurality of rotary positions in the stationary contact banks; a selected line finder is caused by the common control relays to find a marked location in its stationary contact banks by first stepping its movable contacts through the plurality of vertical levels until a marked vertical level is found and by thereafter stepping its movable contacts through the plurality of rotary positions until a marked rotary position is found, wherein each vertical step is represented by a corresponding pulse in a first pulse set on a first one of the control leads and each rotary step is represented by a corresponding pulse in a second pulse set on the first one of the control leads;

wherein said step of detecting the marked location is accomplished by determining the number of pulses in the first and second pulse sets on the first one of the control leads.

3. A method as recited in claim 2, wherein step of detecting the marked location further includes the step of distinguishing between the first and second pulse sets by noting the elapse of a predetermined period of time between successive pulses on the first one of the control leads.

4. A method as recited in claim 2, in which: the group of subscriber lines are divided into first and second subgroups; the plurality of line finders consist of first and second line finder subgroups, each of the subscriber lines in the group terminating at a unique location in the stationary contact banks in the first line finder subgroup and at a different unique location in the stationary contact banks in the second line finder subgroup; the line equipment consists of first and second line equipment connected to the subscriber lines in the first and second subgroups, respectively, the first line equipment being operative to detect a calling subscriber line in the first subgroup and to responsively mark a location in the first line finder subgroup and a different location in the second line finder subgroup corresponding to the detected calling subscriber line and the second line equipment being operative to detect a calling subscriber line in the second subgroup and to responsively mark a location in the first line finder subgroup and a different location in the second line finder subgroup corresponding to the calling subscriber line; and, the common control relays consist of first and second subgroup control relays, the first subgroup control relays being responsive to detection of a calling subscriber line in the first subgroup to select and control one of the line finders in the first and second line finder subgroups and the second subgroup control relays being responsive to detection of a calling subscriber line in the second subgroup to select and control one of the line finders in the first and second line finder subgroups;

wherein said method includes the further steps of: identifying a selected line finder by monitoring each of the line finder lines to detect seizure thereof; detecting which of the first and second subgroup control relays has selected and controlled one of the line finders by monitoring the signals on additional ones of the control leads between the common control relays and the selected line finder, and converting the identification of the selected line finder, the detected subgroup control relays, and the detected marked location into the line number of the calling subscriber line.

5. A method as recited in claim 4, in which each line finder includes a first cut-through relay responsive to a signal on a second one of a control leads from the common control relays to complete a connection between a calling subscriber line in the first subgroup and the associated line finder line, and a second cut-through relay responsive to a signal on a third one of the control leads from the common control relays for completing a connection between a calling subscriber line in the second subgroup and the associated line finder line;

wherein said step of detecting which of the first and second subgroup control relays has selected and controlled a line finder is accomplished by monitoring the signals on the second and third ones of the control leads from the common control relays.

6. A method as recited in claim 4, wherein said step of identifying a selecting line finder is accomplished by monitoring the voltage across each of the line finder lines for a change from a first voltage level representing an idle condition to a second voltage level representing a seized condition.

7. A method for monitoring data related to telephone calls placed through an electromechanical telephone switching system of a type consisting of step-by-step and all-relay switching systems, the switching system including: a plurality of line finders for a group of subscriber lines, wherein each of the subscriber lines in the group is terminated at a unique location in each of the line finders and wherein each of the line finders is operative to couple one of the subscriber lines to an associated line finder line; and, common control equipment for the group that has connected thereto each of the subscriber lines in the group and that is connected to each of the line finders by a plurality of control leads, the common control equipment being operative to detect the initiation of a call on a calling subscriber line in the group, to responsively mark the location corresponding to the detected calling subscriber line in each line finder, to select one of the line finders whereupon the associated line finder line is seized and to cause the selected line finder to find the marked location corresponding to the calling subscriber line, said method comprising the steps of:

determining the line number of the calling subscriber line by: detecting the marked location in the selected line finder through monitoring the signal on at least one of the control leads between the common control equipment and the selected line finder; and, converting the detected marked location into the line number of the calling subscriber line;

determining the dialed telephone number of the called subscriber by monitoring the line finder line associated with the selected line finder to detect successive dial pulse sequences thereon;

determining a start time for the call by monitoring the line finder line to detect the start of answer supervision thereof; and, determining the duration of the call by monitoring the line finder line to determine the time between the start of answer supervision thereon and release of the line finder line.

8. A method as recited in claim 7, wherein detection of successive dial pulse sequences on the line finder line is accomplished by monitoring the voltage across the line finder to detect each change from a second voltage level representing a seized condition to a first voltage level representing an idle condition.

9. A method as recited in claim 8, wherein the number of dial pulses in each said dial pulse sequence is determined by counting the number of successive changes in the voltage across the line finder line from said second voltage level to said first voltage level, and wherein a separation between successive dial pulse sequences is determined by detecting the elapse of a predetermined interval between a change in the voltage across the line finder line from said first voltage level to said second voltage level and a successive change in the voltage across the line finder line from said second voltage level to said first voltage level.

10. A method as recited in claim 7, wherein determination of said start time is accomplished by monitoring the line finder line to detect a change in the voltage thereacross from a second voltage level representing a seized condition to a third voltage level representing an answer supervision condition.

11. A method as recited in claim 7, wherein determination of said duration is accomplished by monitoring the line finder line to detect a first change in the voltage thereacross from a second voltage level representing a seized condition to a third voltage level representing an answer supervision condition and a successive second change in the voltage thereacross from either said third voltage level or said second voltage level to a first voltage level representing an idle condition, and by determining the time between said first and second changes.

12. A method as recited in claim 7, further comprising the step of assembling a call data record for each call that includes the line number of the calling subscriber line, the dialed telephone number, the start time of the call and the duration of the call.

13. A method as recited in claim 12, further comprising the step of converting the line number of the calling subscriber line in each said call record into the corresponding directory number of the calling subscriber.

14. A method for determining the unique location in the stationary contact banks of a step-by-step line finder at which a calling subscriber line in a group of subscriber lines is terminated, the unique location being defined by a marked vertical level in a plurality of vertical levels in the stationary contact banks and a marked rotary position in a plurality of rotary positions in the stationary contact banks, and the line finder being controlled by common control relays to vertically step to the marked vertical level and to then rotary step to the marked rotary position, said method comprising the steps of:
   monitoring a control lead between the line finder and the common control relays that has present thereon a series of pulses during stepping of the line finder, each said pulse representing a single step of the line finder;
   detecting the number of pulses in a first pulse set on said control lead to determine the marked vertical level of the unique location; and,
   detecting the number of pulses in a second pulse set on said control lead to determine the marked rotary position of the unique location.

15. A method as recited in claim 14, further comprising the step of distinguishing between said first and said second pulse sets by detecting the elapse of a predetermined interval between successive pulses on said control lead.

16. A call data monitoring system for a telephone switching system, said call data monitoring system including:
   a plurality of front end processors, each said front end processor providing call data monitoring for a set of subscriber lines connected to the telephone switching system by: receiving signals from that portion of the switching system to which is connected said set of subscriber lines; monitoring said signals to determine, for each call placed on a calling subscriber line in the set, the line number of the calling subscriber line, the dialed telephone number of the called subscriber, the start time of the call, and the duration of the call; and, assembling a call data record for each said call including the determined line number, dialed telephone number, start time, and duration;
   a storage means; and,
   a main processor interconnected with said plurality of front end processors and with said storage means and operative: to receive each said call data record from each of said plurality of front end processors; to convert the line number in each said received call data record into the corresponding directory number of the calling subscribers; and, to store each said converted call data record in said storage means.

17. A call data monitoring system as recited in claim 16, for use with an electromechanical telephone switching system of a type consisting of step-by-step and all-relay switching systems wherein the subscriber lines in each set are divided into a plurality n of groups and wherein the switching system includes a corresponding plurality n of line finder groups, each line finder group including a plurality m of line finders each having an associated line finder line going to the remaining portion of the switching system and each being selected and controlled by common control equipment for the line finder group to find a calling subscriber line in the corresponding group of subscriber lines and to couple the calling subscriber line to its associated line finder line; wherein said call data monitoring system further comprises:
   a plurality n of calling line monitor groups, each said calling line monitor group including a plurality m of calling line monitors, each said calling line monitor being interconnected with the line finder line of a corresponding one of the plurality m of line finders in the corresponding line finder group and being operative to provide an output signal representing the voltage across the corresponding line finder line;
   means coupling the output signal from each of said plurality m of calling line monitors in each of said plurality n of calling line monitor groups to that one of said plurality of front end processors providing call data monitoring for the associated set of subscriber lines;
   means coupling a control signal on at least one control lead between the common control equipment and the line finders in each of said plurality n of line finder groups to that one of said plurality of front end processors providing call data monitoring for the associated set of subscriber lines, each said control signal representing a marked unique location of a calling subscriber line in a selected line finder in the corresponding line finder group;
   and, wherein each said front end processor monitors each of said control signals and each of said output signals coupled thereto to determine and assemble a call data record for each call placed on the associated set of subscriber lines.

* * * * *

UNITED STATES PATENT AND TRADEMARK OFFICE
CERTIFICATE OF CORRECTION

PATENT NO. : 4,412,101
DATED : October 25, 1983
INVENTOR(S) : Wallace G. Brown et al.

It is certified that error appears in the above-identified patent and that said Letters Patent is hereby corrected as shown below:

| | |
|---|---|
| Column 3, line 43: | insert --a-- before "plurality" |
| Column 6, line 10: | "examine" should be --example-- |
| line 45: | "select" should be --selector-- |
| Column 7, line 51: | "LF11-LF20" should be --LF11 . . . LF20-- |
| Column 9, line 61: | "Group" should be --group-- |
| Column 11, line 59: | "1NT" should be --INT-- |
| Column 14, line 17: | "request" should be --requests-- |
| line 42: | "verticl" should be --vertical-- |
| line 44: | delete --to-- |
| Column 15, line 23: | delete --to-- |
| line 55: | "ocurred" should be --occurred-- |
| line 55: | "At" should be --As-- |
| Column 19, line 22: | insert --the-- before "step" |
| Column 20, line 19: | "selecting" should be --selected-- |
| line 68: | insert --line-- after "finder" |
| Column 22, line 22: | "subscribers" should be --subscriber-- |

Signed and Sealed this

First Day of May 1984

[SEAL]

Attest:

GERALD J. MOSSINGHOFF

Attesting Officer

Commissioner of Patents and Trademarks